(12) United States Patent
Lake (10) Patent No.: US 7,979,371 B2
(45) Date of Patent: Jul. 12, 2011

(54) PREDICTIVE MONITORING FOR EVENTS AT COMPUTER NETWORK RESOURCES

(75) Inventor: John Michael Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 12/015,653

(22) Filed: Jan. 17, 2008

(65) Prior Publication Data

US 2009/0187521 A1 Jul. 23, 2009

(51) Int. Cl.
*G06N 5/00* (2006.01)
(52) U.S. Cl. ............................................. 706/21; 706/45
(58) Field of Classification Search .................... 706/21, 706/45
See application file for complete search history.

(56) References Cited

U.S. PATENT DOCUMENTS

2002/0174083 A1 11/2002 Hellerstein et al.
2005/0137832 A1 6/2005 Yemini et al.
2006/0023638 A1 2/2006 Monaco et al.

OTHER PUBLICATIONS

Duran, et al., Smart Equipment and Systems to Improve the Reliability and Safety in Future Nuclear Plants, Project No. 99-306, Sandia National Laboratories, Sep. 2003, pp. 1-164.*

\* cited by examiner

*Primary Examiner* — Wilbert L Starks, Jr.

(57) ABSTRACT

Computer resources in a computer network can be predictively monitored where those resources are conventionally monitored using a monitoring rule. For predictive monitoring, the current values of the parameters of the monitoring rule are tracked at regular intervals. The current values are used in an "inverted" or predictive form of the conventional monitoring rule to derive a predictive value that is indicative of the imminence of a defined event. The monitoring system may be instructed to report a predictive value that exceeds a predetermined percentage of the final value at which the resource event will be deemed to have occurred. The earlier report increases the chances the network manager will have sufficient time to take appropriate preemptive action to prevent actual occurrence of the event.

9 Claims, 5 Drawing Sheets

| Event | ETTV |
|---|---|
| A | > 1 day |
| B | < 1 day |
| C | < 6 hours |
| D | < 3 hours |
| E | < 1 hour |

FIG. 4

| Event | Resource | ETTV |
|---|---|---|
| A | srvr1 | > 1 day |
| B | srvr2 | < 1 day |
| C | srvr3 | < 6 hours |
| D | srvr4 | < 3 hours |
| E | srvr5 | < 1 hour |

PREDICTIVE MONITORING FOR EVENTS AT COMPUTER NETWORK RESOURCES

BACKGROUND OF THE INVENTION

The present invention relates to computer networks and more particularly to predictive monitoring for anticipating the occurrence of an event at a computer network resource.

The term "network resource" is a term that should be interpreted broadly enough to cover almost any hardware or software included in a computer network. The term includes, but is not limited to, special-purpose hardware devices such as switches, routers, hubs, content servers, network storage devices, etc., including the control programs for such hardware devices. The term also includes application programs that execute on either special-purpose or general-purpose hardware components.

It is common to monitor a network resource for the purpose of detecting the occurrence of a defined, primary event at the resource. In some cases, the primary event can be detected directly; e.g., the activation (or deactivation) of a particular port in a router. In other cases, the primary event is directed indirectly by detecting two or more secondary events and correlating the detections of the secondary events in accordance with a predefined event correlation rule in order to support a conclusion that the primary event has occurred at the resource.

Event correlation rules can be used not only to infer a conclusion that a primary event has occurred but also to identify possible causes for the primary event and thus possible network management actions that might be taken to remedy any problems that might be caused by the primary event. As an example, assume that a network monitor tracks both utilization levels for a web application server threadpool (secondary event A) and response times for the web application server (secondary event B). If the network monitor detects the web application server threadpool is 100% utilized at the same time the web application server's response time has risen to greater than four seconds, an existing event correlation rule might support a primary event conclusion that the web application server response time is exceeding four seconds because the web application server is too small and should be enlarged.

Event correlation technology can be extremely useful in filtering and correlating large number of "raw" network events to support conclusion that a particular network management action is all that is needed to deal with what appears to be a large number of network problems. However, event correlation technology is reactive in nature. That is, network management action is not initiated until the event correlation rule indicates the primary event has already occurred.

BRIEF SUMMARY OF THE INVENTION

The present invention may be embodied as a method for monitoring a computer resource to characterize the risk of a primary event in terms of the expected time to occurrence where occurrence of the primary event can be inferred from detection of associated secondary events. Current properties of the primary event and associated secondary events are observed to determine the likelihood of the primary event occurring given the observed current properties of the associated secondary events and the probability of the primary event occurring spontaneously. An expected time to occurrence is estimated from the determined probability. A resource management action is initiated if the primary event likelihood or the expected time to occurrence exceeds a predetermined threshold.

The invention may also be embodied as a computer program product monitoring a computer resource to characterize the risk of a primary event in terms of an expected time to occurrence where occurrence of the primary event can be predicted from detection of associated secondary events. The computer program product includes a computer usable medium embodying computer usable program code. The embodied code is configured to observe current properties of the primary event and associated secondary events, to determine the probability the primary event will occur given observed current properties of the associated secondary events and the probability the primary event will occur spontaneously, and to initiate a resource management action if the determined primary event probability or the expected time to occurrence exceeds a predetermined threshold.

Finally, the invention may be embodied as a system for monitoring a computer resource to characterize the risk of a primary event in terms of an expected time to occurrence where occurrence of the primary event can be predicted from detection of associated secondary events. The system includes a resource monitoring subsystem for observing current properties of the primary event and associated secondary events, logic for determining the probability that the primary event will occur given the observed current properties of the associated secondary events and the probability of the primary event occurring spontaneously and logic for estimating an expected time to occurrence from the determined probability. The system further includes a resource management subsystem for initiating a resource management action if the primary event probability or the expected time to occurrence exceeds a predetermined threshold.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
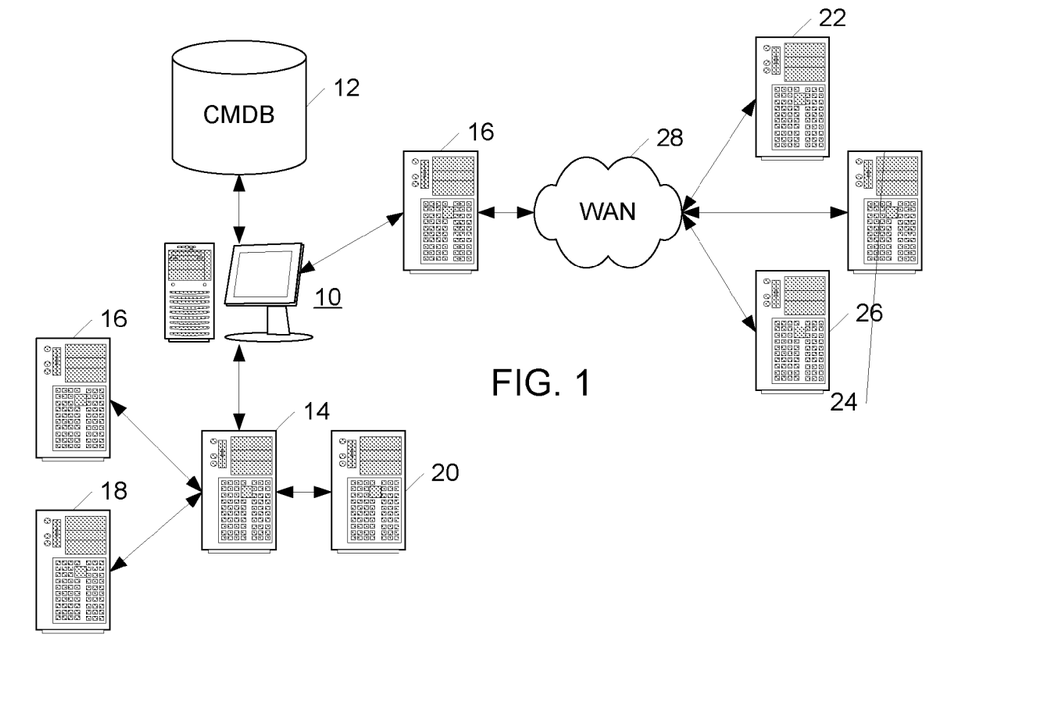
FIG. 1 is a pictorial representation of a managed computer network including managed resources, resource monitors and a network management station.

FIG. 1 is an overview of a simple computer network shown as managed by a single network management system or network manager 10. The network manager 10 is linked to a CMDB or configuration management database 12 that stores configuration information about each of the resources in the computer network. The network resources include network monitors 14 and 16 that have the task of monitoring the performance of other resources in the computer network. Network monitor 16 is shown as being connected to a set of managed resources 22, 24, 26 through a wide area network (WAN) while network monitor 14 is shown as having directly-connected and managed resources 16, 18, 20.

The network representation is simplified for ease of illustration. In reality, a computer network would have more network monitors and each monitor would be responsible for many more managed resources. Also, while the drawing shows the network monitors as separate hardware devices, the network monitors may actually be computer program applications that run in the same or different hardware devices as the network manager. Furthermore, while each of the managed resources 16, 18, 20, 22, 24 and 26 is represented as a hardware device, the resource match to be a computer application program running on the a general-purpose computer device.

A primary function of a network management system is to monitor the performance of network resources in order to detect the occurrence of defined, primary events at the resource. As noted earlier, some primary events can be detected directly while others are detected indirectly by detecting the occurrence of one or more secondary events and correlating the occurrence of those events in order to confirm the occurrence of the primary event.

Figure 2:
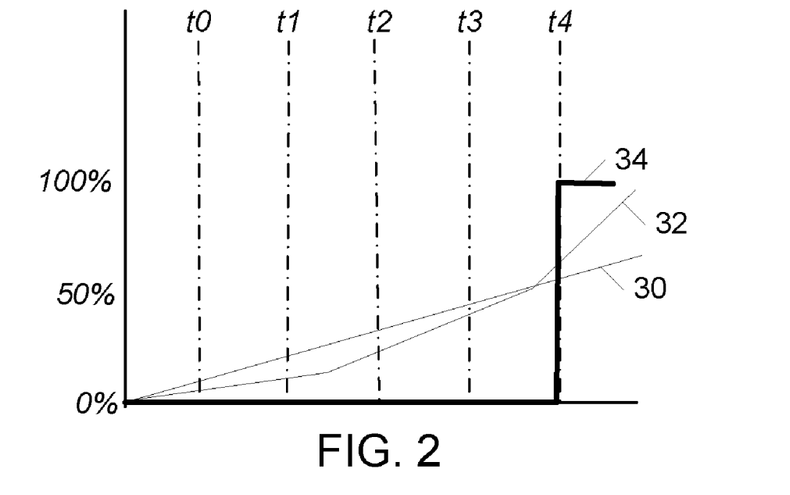
FIG. 2 is an illustration of conditions that may occur when convention event correlation practices are followed to detect the occurrence of a network event in a computer network.

FIG. 2 is a graphical representation of events that are observed during a conventional network monitoring operation. It is assumed that a primary event is defined as occurring when two associated secondary events are observed. Using the example given earlier, one of the associated secondary events may be the level of utilization of a web application server threadpool, represented in the figure as a line 30 generally trending upwardly. The other of the associated secondary events may be the web application server response time, represented in the figure as a line 32, also trending upwardly. The primary event is defined as occurring when both secondary events reach predefined thresholds. Again, using the earlier example, the threshold for the threadpool utilization can be 100% utilization while the threshold for web application server response time may be 4 seconds.

It is assumed in the figure that both secondary events are monitored at regular intervals represented by times t0, t1, t2, t3 and t4, but that values of either or both of the secondary events are found to be below their defined thresholds until time t4. It is assumed at time t4 that both secondary events are detected as having occurred (i.e., their values at time t4 have met or exceeded their defined threshold values). By definition, the primary event is deemed to occur at time t4, as represented by the step function line 34. As a corollary, the primary event is not detected at any time before time t4 even though the values of the associated secondary events may have been approaching the threshold values long before time t4.

Figure 3:
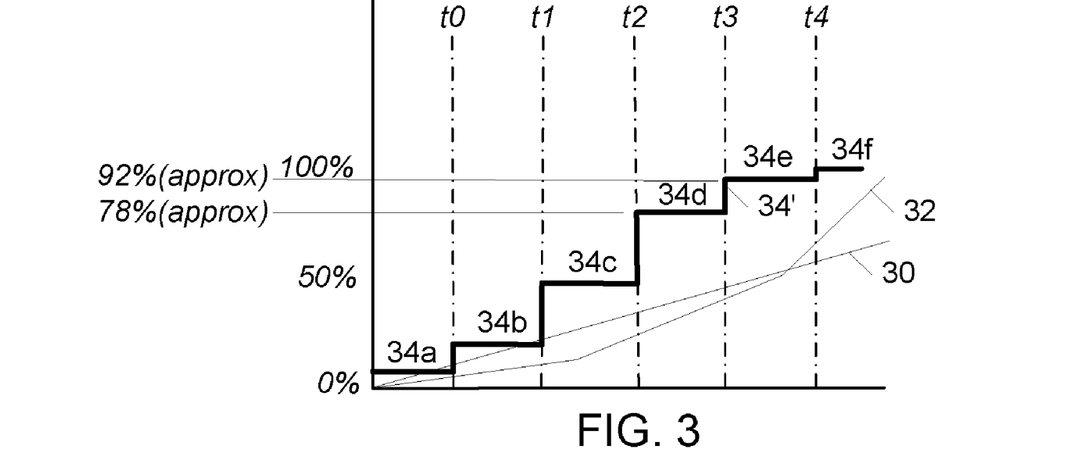
FIG. 3 is an illustration of conditions that may occur when the present invention is used to detect the occurrence of a network event in a computer event.

A system implementing the present invention goes beyond merely making a "binary" determination whether a primary event has occurred as was described with reference to FIG. 2. A system implementing the present invention instead, determines the probability that the primary event will occur at a given time given current values for each of the associated secondary events. Referring to FIG. 3, the same secondary events that were discussed above are illustrated. That is, the level of utilization of the web application server thread pool is represented by line 30 while the web application server response time is represented by line 32. In accordance with the present invention, the network monitor goes beyond merely detecting whether each of the secondary events has occurred (that is, exhibits a property that exceeds a predefined threshold) and detects the current property or value even though it is below the defined threshold. Using the mathematics of probabilities, the probability that the primary event will occur given the current properties of the associated secondary events is determined at the end of each sampling interval; that is, at times t0, t1, t2, t3, t4.

The probability "curve" for the primary event is represented as an irregular stair-stepped line 34' having an initial level 34a, a final level 34f, and increasing intermediate levels 34b-34e. Each level on the stairstepped line (other than levels 34a and 34f) represents the probability at a given time t that the primary event will occur at time t+1 given the current values of the associated secondary events at time t. The initial level 34a cannot be based on current values of the associated secondary events because those current values are not even obtained until time t0. Initial level 34a is a baseline probability value that reflects the fact that there is always at least a minimal, non-zero probability that the primary event will occur at the end of the next sampling period regardless how low the initial values for associated secondary events may be. Final level 34f represents a 100% probability for the primary event; that is, that the current values of the associated secondary events exceeded their thresholds at the end of the sampling interval and the primary event has, by definition, already occurred. Subsequent increases in the values of the associated secondary events cannot increase the probability beyond the 100% level.

An inspection of the curve shows that the probability that the final event will occur by the end of the next sampling interval can reach significant levels long before the secondary event values reach their threshold levels. As a specific example, the current secondary event values at time t2 support a determination that there is a 78% probability (level 34d) that the primary event will occur at or before time t3. Similarly, the secondary event values at time t3 support a determination that there is a 92% probability (level 34e) that the primary event will occur before time t4 notwithstanding the secondary event values at time t3 are still well below their defined threshold values.

As will be discussed in more detail below, the probability information can be passed on to a network manager to enable the manager to initiative preemptive actions without having to wait to learn that the primary event has already occurred.

As a general proposition, the probability equation that is needed to determine the probability the primary event will occur can be obtained by "inverting" the event correlation rule that initially defined the primary event. Using the same web application server threadpool and response time example mentioned above, the event correlation rule for that example would have the general form: If A (instance . . . ) && B(instance . . . ) then create C (instance . . . ") and mark A(instance . . . ) as the probable or root cause for B, and mark B as the "root cause" for C where:

A is defined as an event indicating the web application server threadpool is 100% utilized;

B is defined as an event indicating the web application server response time is greater than 4 seconds; and C is a conclusion that the response time exceeds 4 seconds because the threadpool is too small and may need to be enlarged.

The event correlation rule defined above can be recast into a predictive rule having the general form: $P(C(instance))=P(A\&\&B)=P(A|B)*P(B)+P(B|A)*P(A)$ where $P(C(instance))$ is the probability of conclusion C;

$P(A)$ is the probability of event A;

$P(B)$ is the probability of event B:

$P(A|B)$ is the probability of event A given event B; and $P(B|A)$ is the probability of event B given event A.

Such a predictive rule can be implemented in the form of a Markov system which can be in one of several (numbered) states and can pass from one state to another each time step according to fixed probabilities. If a Markov system is in state 1 at a particular time, there is a fixed probability $P_{12}$ that the system will transition to state 2 at the next time step. The quantity $P_{12}$ is called a transition probability.

A Markov system can be illustrated as a state transition diagram where the nodes represent states defined in terms of whether or not particular events have been observed.

The predictive rule can be represented by a state diagram where four states are defined as:

s0=neither event A nor event B has been observed;

s1=event A has been observed but event B has not been observed;

S2=event B has been observed but event A has not been observed; and

S3=both events A and B have been observed.

Historical data is used to complete a transition matrix, giving the probability of moving from any one state to another instantaneously. Specifically, the probability of a transition from s0 to s1=P(A), the probability of a transition from s0 to s2=P(B), the probability of a transition from s1 to s3=P(B|A), and the probability of a transition from s2 to s3=P(A|B).

The probability of landing in state s3 within a window spanning several time intervals can be estimated given the current state and assuming a Poisson process as:

$$P(C|current\ state\ is\ si)=P(X\_T=s3|X\_0=si).$$

Figure 4:
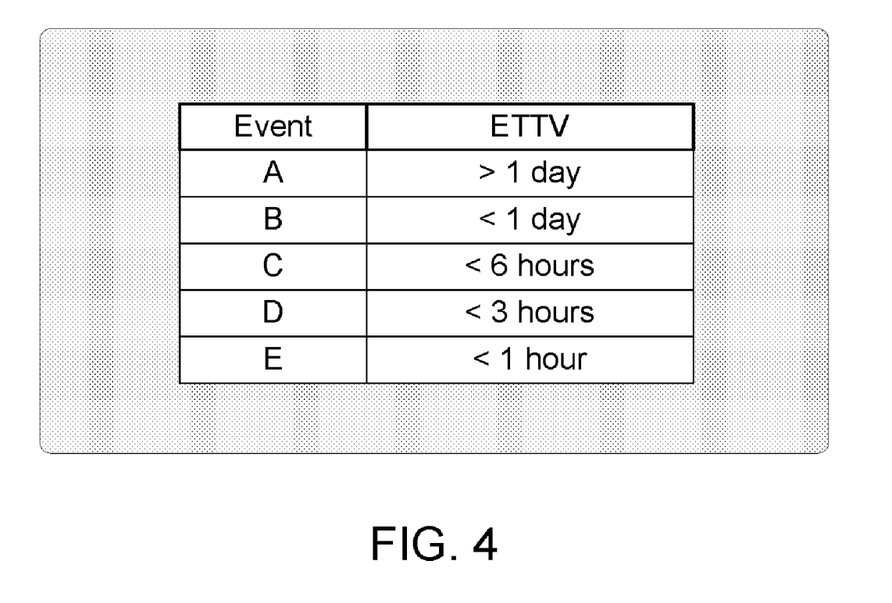
FIG. 4 is one example of a system management display that may be generated during use of the present invention.
Figure 5:
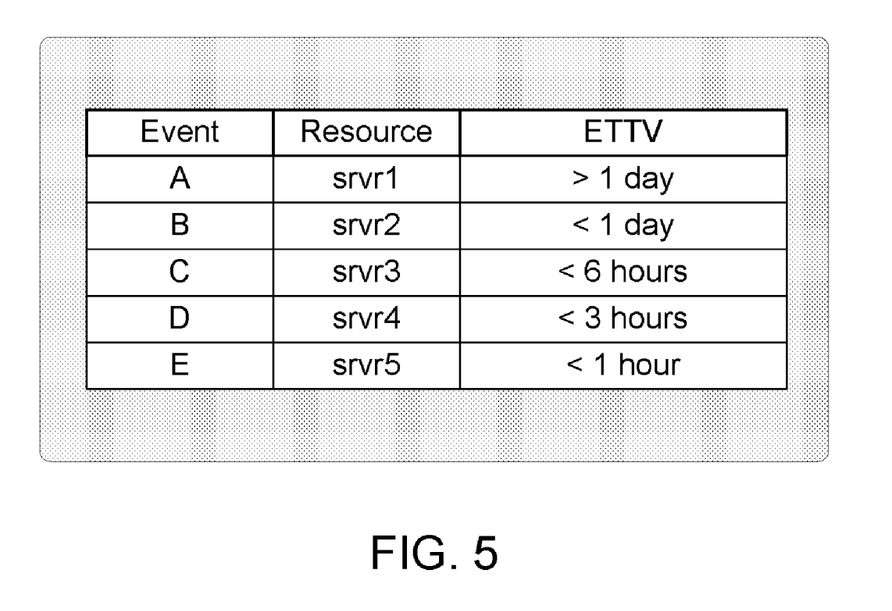
FIG. 5 is another example of a system management display that may be generated during use of the present invention.

The T-step transition probability can be computed as the T'th power of the transition matrix M. The resulting probability estimate can be used to populate and maintain a system management display of the type shown in FIG. 4 wherein A, B, C, D and E are defined system events and ETTV is an Estimated Time To Violation (occurrence of the associated event). If the defined events are tied to resource data, a system management display of the type shown in FIG. 5 may be used to provide ETTV estimates for specific network resources. Such systems management displays clearly inform data center managers where pre-emptive actions are needed most.

The description above assumes the generation of a single predictive rule based on a single event correlation rule. Where a collection of correlation rules is involved, the number of states in the state transition diagram must be increased. There may be a plurality of rules that describe different conditions under which the target event C occurs, as well as "spontaneous" occurrences that occur with no known pre-cursor cause. The probability of event C arising from any cause can be determined using the same method described above, with the probability of the event C being observed at any given time determined by the likelihood of being in any state including event C.

Figure 6:
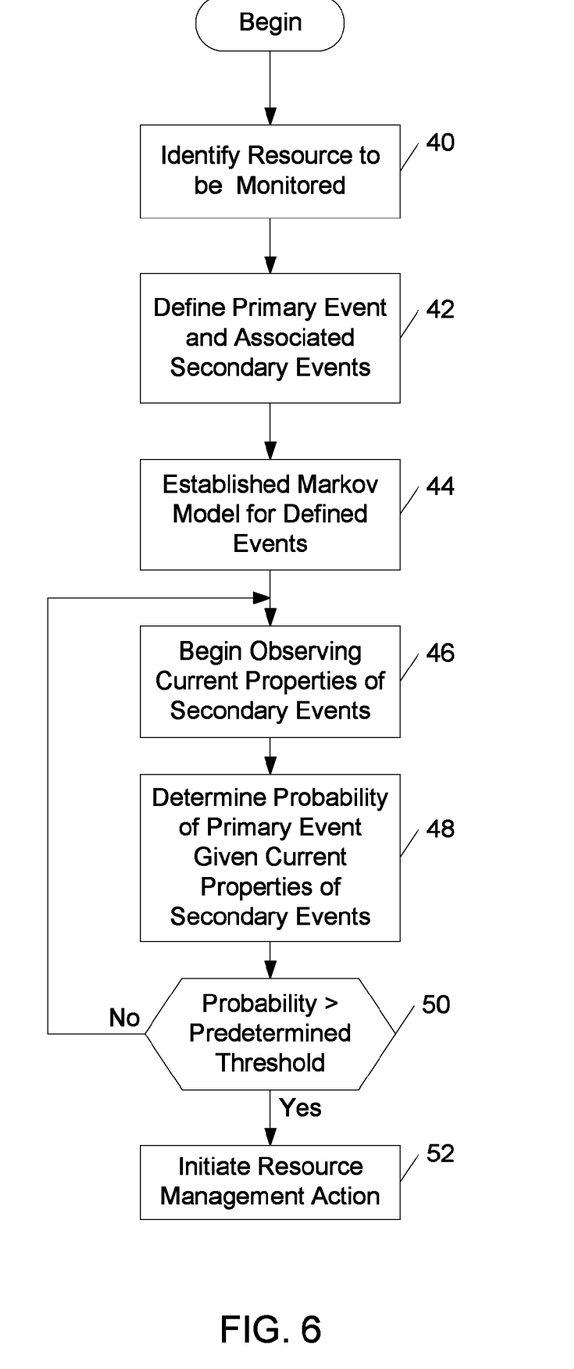
FIG. 6 is a flow chart of basic operations performed in accordance with the present invention.

FIG. 6 is a flow chart of operations that are performed during use of the present invention. The initial step 40 is to identify the network resource that is to be predictively monitored. The conventional monitoring rule applicable to that resource is retrieved in step 42 and inverted to predictive rule form in step 44. Once the conversion has occurred, the network monitor begins tracking the current values of the parameters of the predictive rule in an operation 46.

The network monitor periodically calculates an event predictive value based on the current parameter values in a step 48 and determines (in step 50) whether the calculated predictive value is greater than a set threshold. If the predictive value is not greater than the set threshold, the system continues its monitoring of the parameter values, periodically calculating new event predictive values. Once it is determined, in step 50, but the most recently calculated predictive value has exceeded the set threshold, resource management action is initiated in the step 52. A common resource management action would be generation of an alert to be sent to the network manager.

Figure 7:
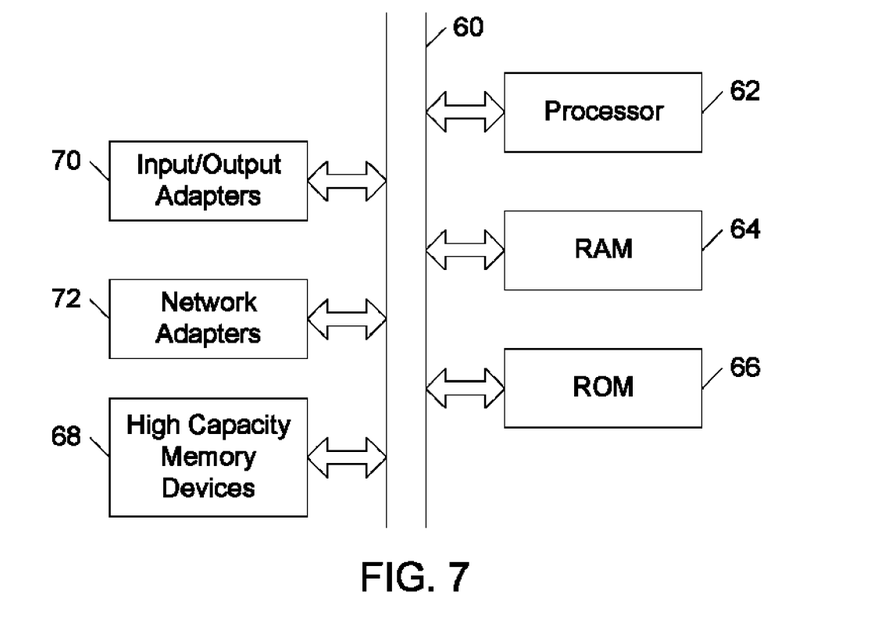
FIG. 7 is a schematic representation of the hardware infrastructure of a general-purpose computer device for implementing the present invention.

FIG. 7 is a block diagram of a hardware infrastructure for a general-purpose computer device that could, when programmed properly, be used to implement the present invention. The infrastructure includes a system bus 60 that carries information and data among a plurality of hardware subsystems including a processor 62 used to execute program instructions received from computer applications running on the hardware. The infrastructure also includes random access memory (RAM) 64 that provides temporary storage for program instructions and data during execution of computer applications and are read only memory (ROM) 66 often used to store program instructions required for proper operation of the device itself, as opposed to execution of computer applications. Long-term storage of programs and data is provided by high-capacity memory devices 68, such as magnetic hard drives or optical CD or DVD drives.

In a typical computer system, a considerable number of input/output devices are connected to the system bus 60 through input/output adapters 70. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 72 that are used to connect the system to other computer systems through intervening computer networks.

Figure 8:
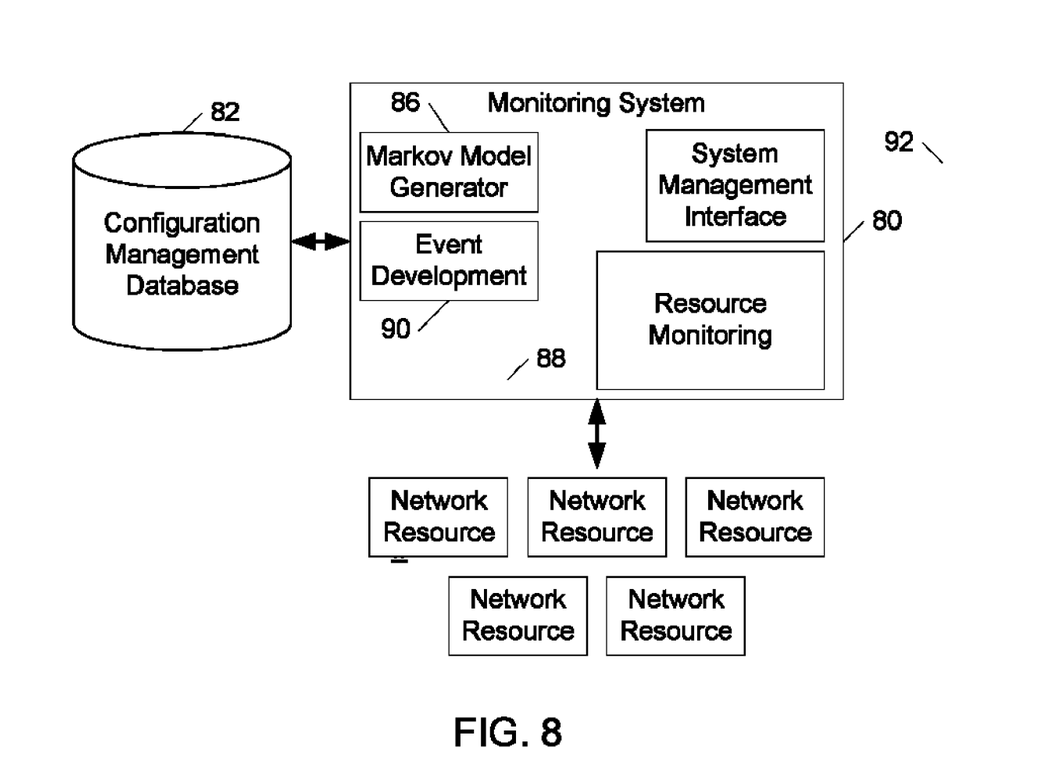
FIG. 8 is a schematic representation of a special-purpose device for implementing the present invention.

The invention may also be implemented using a special-purpose hardware device in which the functions described above are implemented in hardware, microcode or some combination of the two. FIG. 8 represents the functional infrastructure of such a special-purpose hardware device. The device, implemented as a monitoring system 80, would work with the previously-mentioned configuration management database 82. System 80 would include a rules translation engine 86 that would perform the necessary "inversions" of conventional monitoring rules to derive the predictive rules discussed above. A resource monitoring subsystem 88 would monitor the operation of the managed resource to track the current values of rule parameters. The rule parameter values would be reported to an event development engine 90 that would generate event predictive values based on the current parameter values. The event development engine would interface with a system management interface 92. System management interface 92 would be used to provide a report to a network manager when the predictive value reached or exceeded a set threshold.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for monitoring a computer resource to characterize the risk of a primary event in terms of an expected time to occurrence where occurrence of the primary event can be predicted from the detection of associated secondary events, the method comprising:
- observing current properties the primary event and the associated secondary events;
- determining the probability that the primary event will occur given the observed current properties of the associated secondary events and the probability of the primary event occurring spontaneously;
- estimating an expected time to occurrence from the determined probability; and
- initiating a resource management action if the primary event probability or the expected time to occurrence exceeds a predetermined threshold.

2. A method according to claim 1 wherein determining the probability that the primary event will occur given the current probabilities of the associated secondary events further comprises establishing a multi-state Markov model wherein one state represents observations of all of the associated secondary events while other states represent an observation of only one of the secondary events and observations of different combinations of observed secondary events.

3. A method according to claim 2 further including employing historical data in the Markov model to establish the probability of transitioning from a state to any other reachable state in the model.

4. A computer program product for monitoring a computer resource to characterize the risk of a primary event in terms of an expected time to occurrence where occurrence of the primary event can be predicted from the detection of associated secondary events, said computer program product comprising a computer usable medium having computer usable program code embodied therewith, said computer usable program code comprising:
- computer usable program code configured to observe current properties of the primary event and the associated secondary events;
- computer usable program code configured to determine the probability that the primary event will occur given the observed current properties of the associated secondary events and the probability of the primary event occurring spontaneously;
- computer usable program code configured to estimate the expected time to occurrence from the determined probability; and
- computer usable program code configured to initiate a resource management action if the primary event probability or the expected time to occurrence exceeds a predetermined threshold.

5. A computer program product according to claim 4 wherein said computer usable program code configured to determine the probability that the primary event will occur given the observed current properties of the associated secondary events and the probability of the event occurring spontaneously further comprises computer usable program code configured to establish a multi-state Markov model wherein one state represents observations of all of the associated secondary events while other states represent an observation of only one of the secondary events and observations of different combinations of observed secondary events.

6. A computer program product according to claim 5 further comprising computer usable program code configured to employ historical data in the Markov model to establish the probability of transitioning from a state to any other reachable state in the model.

7. A system for monitoring a computer resource to characterize the risk of a primary event in terms of the expected time to occurrence where occurrence of the primary event can be predicted from a detection of associated secondary events, the system comprising:
- a resource monitoring subsystem for observing current properties of the primary event and the associated secondary events;
- a logic module for determining the probability that the primary event will occur given the current probabilities of the associated secondary events and the probability of the primary event occurring spontaneously;
- a logic module for estimating the expected time to occurrence from the determined probabilities; and
- a resource management subsystem for initiating a resource management action if the primary event probability exceeds a predetermined threshold.

8. A system according to claim 7 wherein the logic module for determining the probability that the primary event will occur given the current probabilities of the associated secondary events further comprises logic for establishing a multi-state Markov model wherein one state represents observations of all of the associated secondary events while other states represent an observation of only one of the secondary events and observations of different combinations of observed secondary events.

9. A system according to claim 8 wherein the logic for establishing a multi-state Markov model wherein one state represents observations of all of the associated secondary events while other states represent an observation of only one of the secondary events and observations of different combinations of observed secondary events further comprises logic for employing historical data in the Markov model to establish the probability of transitioning from a state to any other reachable state in the model.

* * * * *